United States Patent [19]

De Jager et al.

[11] 4,228,319

[45] Oct. 14, 1980

[54] AUTOMATIC RADIO TELEPHONE SYSTEM

[75] Inventors: Johan B. De Jager; Johannes Noordanus, both of Hilversum, Netherlands

[73] Assignee: U.S. Philips Corporation, New York, N.Y.

[21] Appl. No.: 955,067

[22] Filed: Oct. 26, 1978

Related U.S. Application Data

[63] Continuation of Ser. No. 807,005, Jun. 16, 1977, abandoned.

[30] Foreign Application Priority Data

Jul. 2, 1976 [NL] Netherlands .......................... 7607300

[51] Int. Cl.² ............................................. H04M 7/04
[52] U.S. Cl. .................................... 179/2 EB; 455/31
[58] Field of Search ................. 179/2 EB; 325/53, 54, 325/55, 64

[56] References Cited
U.S. PATENT DOCUMENTS

| | | | |
|---|---|---|---|
| 3,582,787 | 6/1971 | Muller et al. | 179/2 EB |
| 3,898,390 | 8/1975 | Wells et al. | 179/2 EB |
| 3,906,166 | 9/1975 | Cooper et al. | 179/2 EB |

Primary Examiner—John H. Wolff
Assistant Examiner—Joseph A. Popek
Attorney, Agent, or Firm—Thomas A. Briody; William J. Streeter; Algy Tamoshunas

[57] ABSTRACT

In a radio telephone system with mobile and stationary transmitting receiving stations and, connected to the stationary stations, a common switching station through which the mobile stations can be interconnected and connected to the subscribers of a line-wire telephone network, a faster connection set-up and a likewise faster switch-over of existing connections is possible because the stationary stations repeatedly transmit through their cell channel a channel number of a free duplex speech channel which is stored in a storage device in the mobile stations receiving the call channel. In response to a connection set-up command the stored channel number is used for automatically selecting the free duplex speech channel.

3 Claims, 5 Drawing Figures

AUTOMATIC RADIO TELEPHONE SYSTEM

This is a continuation, of application Ser. No. 807,005, filed June 16, 1977 now abandoned.

The invention relates to an automatic radiotelephone system having mobile transmitting-receiving stations which can be connected through a plurality of duplex speech channels to various stationary transmitting-receiving stations which are connected to a common switching station adapted to establish any desired connection between said mobile stations or between said mobile stations and the subscribers of a line-wire telephone network, each one of said stationary transmitting receiving stations comprising at least one transmitter for continuously transmitting for the relevant stationary station on a specific call channel frequency and, furthermore, each having the disposal of a plurality of call channel associated duplex speech channels, each one of said mobile transmitting receiving stations comprising a duplex speech channel selector and a call channel selector which locally selects the strongest call channel frequency received and which automatically tunes the relevant mobile transmitting-receiving station for receipt on the selected call channel.

Systems of the above-mentioned type are known and have been developed in order to extend the facilities of, for example, the public automatic telephone network with a possibility to communicate with mobile stations or between mobile stations, while retaining the fully automatic facilities existing in the public telephone network for establishing a connection.

On a nation-wide scale the spatial organization of such a system is preferably such that the stationary transmitting-receiving stations are for each telephone district under the control of a switching station, each stationary station then being connected to the switching station through voice and signalling circuits, which are in the form of cables. The number of voice circuits between a stationary station and a switching station is equal for each stationary station to the number of radio duplex speech channels the stationary station has the disposal off. The stationary transmitting-receiving stations are preferably geographically arranged in "rosettes," for example in groups of seven base stations, wherein the range of each of the base stations can amount to, for example 6, 12 or 25 km depending on the density of the centres of population and, consequently, the number of subscribers. Within each rosette of seven base stations each one of these stations has the disposal of a plurality of individual duplex speech channels so that within a rosette of seven base stations the available duplex speech channels each occur only once.

In view of the limitation of the total number of duplex speech channels which are available for such an extensive system these channels are used more than once within the system. They are, for example, repeated per group (rosette) of 7 base stations; the distance between two base stations having the same duplex channel frequencies and belonging to adjacent groups being chosen as large as possible in order to minimize the possible occurrence of cochannel interference.

Each switching station comprises a processor by means of which it controls the base stations belonging its district. It processes inter alia the identification and signalling codes transmitted by the mobile stations and, if necessary, switches the calls which enter over the base stations through to the district exchange of the same area.

Alternatively, each switching station can transfer an existing connection between parties which travels through a base station of a district to another base station of the same district or to the switching station of an adjacent district (transfer during conversation between parties).

For the mutual co-operation in locating mobile stations and for switching over during the conversation the switching stations can, if necessary, utilize a main switching station; to this end the interconnected switching stations are also connected to the main switching station through individual data channels and a plurality of individual voice circuits, which are in cable form. As the total number of available duplex channel frequencies is limited, a rapid automatic set up of the connection and, if required, a rapid automatic switch-over during conversation is of the utmost importance in order to be able to utilize the available duplex channel frequencies as efficiently as possible.

A system of the type described in the preamble—wherein the stationary transmitting-receiving stations (base stations) belonging to the area the switching station serves, each transmit continuously on an individual call channel frequency and wherein the mobile radio transmitting-receiving stations which are not engaged are respectively tuned to the call channel which is locally received strongest—has the advantage that each of the mobile transmitting-receiving stations located within the area the switching station can be selectively called (located), simply by simultaneously transmitting the identification code of the wanted mobile station through the call channel of each of the base stations belonging to the area the switching station serves.

For the further connection setup procedure it is required that the called mobile station after receipt of its identification reports itself to the base station to which the relevant mobile station is tuned. Depending on the further concept of the system this can be realized in various manners.

A known method consists, for example, in that the called mobile station, after recept of its identification, automatically searches by means of its duplex speech channel selector a free duplex speech channel and thereafter reports itself to the base station by transmitting its identification code on the selected free speech channel whereafter the called mobile station is connected to the switching station through the selected duplex speech channel and the relevant base station.

For an outgoing call from a mobile station use is then made of a free duplex speech channel searched for in the mobile station itself and through which the own identification and the identification of the desired mobile or network subscriber is transmitted.

A disadvantage of this known system is that the base stations must continuously transmit on the free duplex channel frequencies, marked as such, in order to enable searching a free speech channel in the mobile stations.

A further disadvantage is that searching for such a free speech channel is in certain circumstances a time-consuming procedure which takes place repeatedly not only during the connection set-up but also when switching over during the call and which, consequently, results in little effective use of the available speech channels and, consequently, a low channel efficiency.

A further known method distinguishes itself from the procedure described above in that the mobile stations need not do their own searching for a free duplex speech channel but a free duplex speech channel is located for them by the base station on their request. More particularly, in accordance with this procedure, the called mobile station after receipt of its own identification code reports itself to the relevant base station to whose continuously transmitted call channel frequency it is tuned, by transmitting its identification code through the other call channel frequency of the pair of duplex call channel frequencies. The receipt of this identification code transmitted by the called mobile station is considered in the relevant base station as a request for the allocation of a free duplex speech channel which the base station satisfies by transmitting through its continuously transmitted call channel frequency a channel number which on receipt in the relevant mobile station indicates the allocated free duplex channel to which the mobile station is subsequently automatically tuned to thereby establish a connection through this allocated duplex speech channel and the relevant base station with the switching station.

For a call going out from a mobile station, the allocation of a free duplex speech channel is also requested by reporting to the base station. In the mobile station after selection of a duplex speech channel allocated by the base station the desired mobile or network subscriber is made known to the switching station by transmitting the identification code of the mobile station and that of the desired mobile or network subscriber through the selected duplex speech channel.

Although in this known method the time consuming search for a free duplex speech channel in the mobile stations is avoided this hardly results in an improvement in the channel efficiency since the requesting, allocating, and thereafter selecting, the allocated duplex speech channel is also a time-consuming procedure which also here repeats itself, when ever switching-over of the established connection is necessary.

A known variant of the procedure described last consists in that when the base stations associated with the switching station call a desired mobile station each of these base stations transmit through their continuously transmitted call channel not only the identification code of the desired mobile station, but also a channel command that is to say a channel number of a free duplex speech channel. Such a call accompanied by a channel command has the advantage that the called mobile station can report itself immediately after selection through the ordered duplex speech channel to the relevant fixed station without the need of first requesting the allocation of a free duplex speech channel.

The manner in which this saving in time is realized has, however, the disadvantage that it is obtained to the detriment of the channel efficiency. For, as a result of the fact that the base stations which transmit the call also each transmit an individual channel command, a plurality of speech channel frequencies corresponding in number to the number of base stations which are calling the wanted mobile station are temporarily withdrawn from the total number of channels available, that is to say, until the called mobile station reports itself on one of these channels or the time reserved therefore has elapsed.

It is an object of the invention to improve a system of the type described in the preable so as to thereby achieve a reduction of the time required for establishing a connection as well as a reduction of the time required for particularly rapid automatic switchover when a call is enabled, for the transfer of an existing connection.

In accordance with the invention such a system comprises a channel status store with control means for up-dating per stationary station in the channel status store the instantaneous status "idle" or "busy" of the duplex speech channels of that stationary station and one output register per stationary station which is connected to the channel status store and which is controlled by said control means which output register provides, as long as not all duplex speech channels of that stationary station are busy, the channel number of a free duplex speech channel, the transmitter present in each stationary station for continously transmitting the call channel frequency which is specific for the relevant stationary station comprises a modulator in which this call channel frequency prior to transmission is modulated by a code which is representative of the channel number provided by said output register, and each mobile station comprises a demodulator and a storage register for demodulating and storing in said storage register the channel number transmitted through the received call channel as well as a control device which is connected to said storage register and said duplex speech channel selector, said control device being arranged to effect, in response to a connection set-up command, that the transceiver of the relevant mobile station is automatically tuned to the duplex speech channel indicated by the channel number stored in said storage register.

The invention and its advantages will be further explained with reference to the drawing in which.

Figure 1:
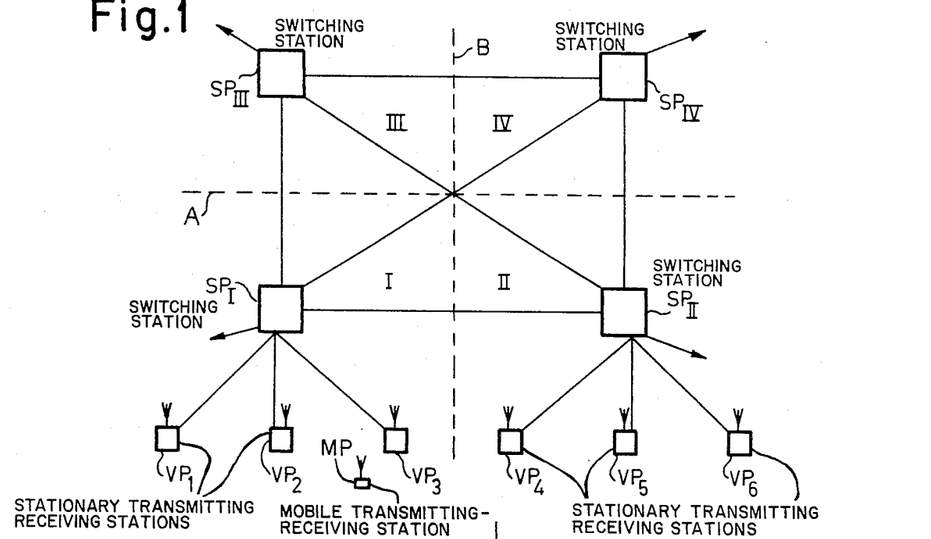
FIG. 1 shows a possible network set-up of an automatic radiotelephone system.

The network set-up of a nationwide automatic radiotelephone system comprises, in view of the extensiveness of the area to be served, a large number of adjacent district. By way of illustration FIG. 1 shows four of these districts which are indicated by I, II, III and IV and which are separated from one another by the dotted, imaginary lines A and B. The districts are each provided with an individual switching station $SP_I$, $SP_{II}$, $SP_{III}$ and $SP_{IV}$ respectively. Through a cable the switching stations are interconnected and also connected to the wire-line telephone network and, possibly, to a main switching station (not shown). In addition, the switching stations are each connected by means of a cable to a number of stationary radio transmitting-receiving stations, (for example seven) which number is the same for each switching station. These stationary stations render it possible to make radio contact with mobile radio transmitting-receiving stations MP which are located within the district of the relevant switching station.

For simplicity FIG. 1 shows only three stationary transmitting-receiving stations $VP_1$, $VP_2$, $VP_3$ associated with the switching station SP$_I$ and three fixed transmitting-receiving stations VP$_4$, VP$_5$, VP$_6$ associated with the switching station SP$_{II}$. The frequency band available for the system is preferably in the GHz-range and comprises a number of predetermined call channels (for example 7) and a number of duplex speech channels (for example 200). Per district use is made of the same call channels and the same duplex speech channels. The number of call channels and duplex speech channels repeated per district is distributed across the stationary transmitting-receiving stations located in the district such that each of these stations has at least one individual call channel and a plurality of own duplex speech channels associated with the relevant call channel.

With the system described so far the situation is such that each stationary transmitting-receiving station continuously transmits or its call channel frequency which is specific for the relevant stationary station. Each one of the mobile stations are provided with a call channel selector which is constructed in known manner and which comprises inter alia a scanning device for scanning the call channel frequencies utilized within the system and for selecting the call channel frequency which is locally received strongest and for automatic tuning of the receiver present in the mobile station to the selected call channel frequency.

It is also customary that this selection procedure is periodically repeated in order to ensure with a relatively great certainty that the idle mobile stations are indeed tuned to the call channel which is locally received strongest.

Figure 2:
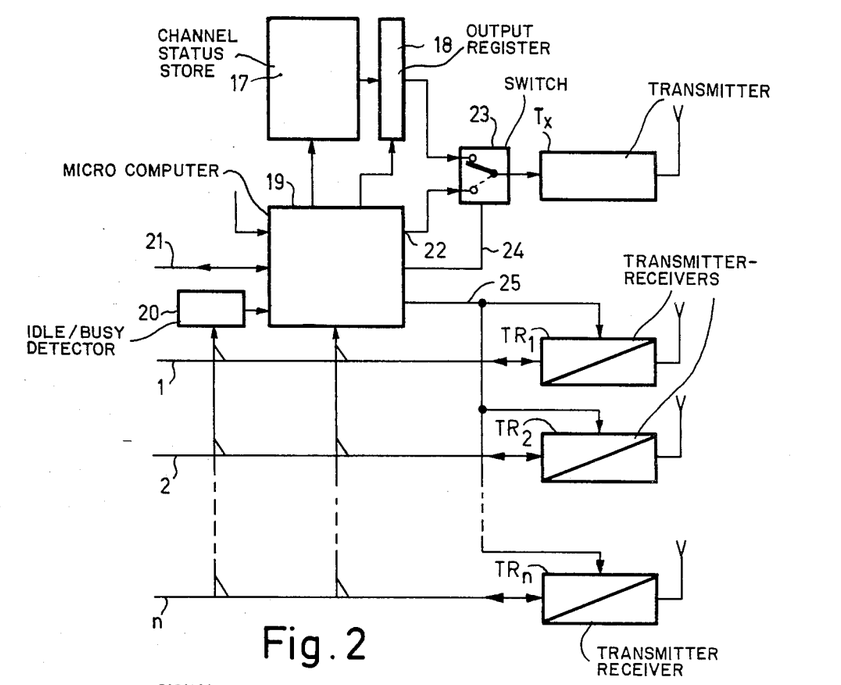
FIG. 2 shows a possible embodiment of a stationary radio-transmitting and receiving station according to the invention used as a base station in such a system.

The stationary transmitting-receiving stations used in the system are, not considering the channel frequencies, identical in structure so that the description of FIG. 2 which shows a possible construction of such a stationary transmitting-receiving station will be sufficient.

Referring to FIG. 2, the stationary transmitting-receiving station comprises for each of the n duplex speech channel frequencies which are available for the stationary station a separate transmitter-receiver TR$_1$, TR$_2$, . . . TR$_n$. Each of these transmitters-receivers is connected to a separate duplex channel core 1, 2, . . . n in the connecting cable between the stationary transmitting-receiving station and the switching station of the district to which this station belongs. In addition, the stationary transmitting receiving station comprises at least one separate transmitter which is indicated by T$_x$ in FIG. 2 and which is arranged for continuously transmitting the call channel frequency which is specific for the relevant stationary station.

Figure 3:
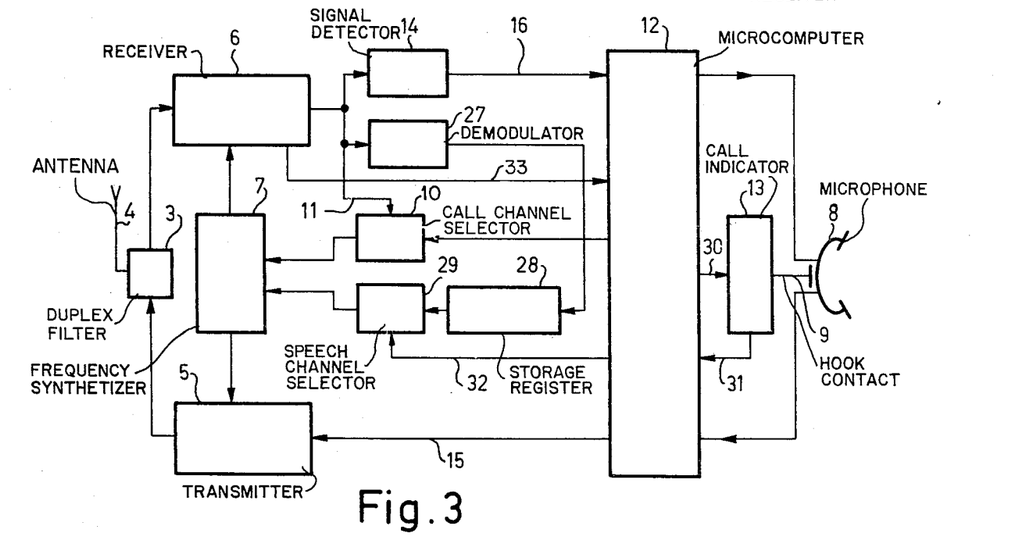
FIG. 3 represents a possible embodiment of a mobile radio-transmitting-receiving station according to the invention used in such a system.

The mobile radio transmitting-receiving stations are identical of construction in all respects. A possible construction of such a mobile radio transmitting-receiving station is shown in FIG. 3. As shown such a mobile station comprises a transmitter 5 and receiver 6 which are connected to an antenna 4 through a duplex filter 3. With the aid of a frequency synthetiser 7 the transmitter 5 and the receiver 6 can each be tuned to the duplex speech channel frequencies utilized within the system. A frequency synthetiser which is particularly suitable for this purpose is described in detail in the prior U.S. Pat. No. 3,956,703.

In the quiescent condition of the mobile radio transmitting-receiving station, that is to say when the telemicrophone shown at 8 is on the hook contact 9, the receiver 6 is tuned by means of the frequency synthetiser 7 to the call channel frequency which is locally received strongest. For selecting this strongest call channel frequency the frequency synthetiser 7 is controlled in the quiescent condition of the mobile station by means of a call channel selector 10 such that the receiver 6 is consecutively tuned to the various call channel frequencies. The call channel selector 10 consecutively receives these call channel signals through the lead 11 and selects in known manner the call channel frequency which is locally received strongest.

In addition, the mobile radio transmitting-receiving station comprises a control device 12 in the form of a micro-computer and a call indicator 13 which gives a visual and/or audible indication when the mobile station is called. The transmitter 5 and the receiver 6 are controlled by and co-operate with the control device 12. So the received signals which, after detection in the signal detector 14 are supplied to the control device 12 result in given system functions. For example, the recognition of the received individual identification code in case the mobile station is called, effects switching through of transmitting and receiving paths 15, 16 to the telemicrophone 8 and further connection set-up functions.

With the system described so far a particularly rapid automatic connection setup and a likewise particularly rapid automatic transfer of an existing connection is rendered possible in that the system further comprises a channel status store and control means for updating in the channel status storage for each stationary station the instantaneous status "idle" or "busy" of the duplex speech channels of that stationary station, and an output register which is connected per stationary station to the channel status storage and which is controlled by said control means, which output register provides, as long as not all duplex speech channels of that stationary station are busy, the channel number of an idle duplex speech channel, and in that furthermore the transmitter T$_x$ present in each one of the stationary stations for continuously transmitting the call channel frequency which is specific for the relevant stationary station, comprises a modulator in which this call channel frequency, prior to transmission, is modulated with a code which is representative of the channel number provided by said output register and in that each mobile station (FIG. 3) comprises a demodulator and a storage register 28 for demodulating and storing in said storage register the channel number which is transferred through the received call channel, as well as a control device connected to its duplex speech channel selector which control device in reponse to a connection set-up command effects that the radio transmitting-receiving device of the relevant mobile station is automatically tuned to the duplex speech channel indicated by the channel number stored in said storage register.

The channel status store may, for example, be common to all the stationary transmitting-receiving stations belonging to a district and in that case it is accommodated in the switching station of the relevant district. Preferably, however, each stationary transmitting-receiving station as shown in FIG. 2 comprises an individual channel status store 17 with output register 18 and individual control means 19 being constituted by a micro-computer. The status "idle" or "busy" of the channels is detected by means of an idle/busy detector 20 which is connected to the channels 1, 2, . . . n and which supplies the channel status information to the control device 19 which registers and up-dates this information for each of the channels in the channel status store 17 and also effects that the channel number of a free duplex speech channel, if available, is present in the output register 18.

In addition, the control means 19 is connected to the switching station through a duplex channel 21 in the cable which connects the stationary transmitting-receiving station to the switching station. Through this channel 21 the call identification codes of desired mobile stations transmitted by the switching station are received by the stationary station. Such an incoming call identification code is stored in the control means 19 in order to enable identification of the called mobile station when the latter reports itself. This call identification code then also appears at an output 22 of the control means 19. The transmitter $T_x$ which continuously transmits the call channel frequency associated with the relevant stationary transmitting-receiving station is provided with a modulator (not shown in the drawing). The input through which the modulating signal is applied to this modulator can be connected to the output register 18 or to the output 22 of the control means 19 by means of a switch 23. The switch 23 is controlled by the control means 19 through a lead 24. The radio transmitting-receiving devices $TR_1$, $TR_2$, . . . $TR_n$ can be switched on individually as and when required by the control means 19 through the lead 25.

Each of the mobile stations is provided as shown in FIG. 3 with a channel number detector in the form of a demodulator 27 connected to the output of the receiver 6 and a storage register 28 for detecting and storing respectively in the storage register a received channel number which indicates a free duplex speech channel. As soon as this free duplex speech channel becomes occupied its channel number is replaced by another received channel number which indicates another free duplex speech channel. The output of the storage register 28 is connected through a speech channel selector 29 to the frequency synthetiser 7. The speech channel selector 29 and the call channel selector 10 are controlled by the control means 12 as will be explained. The system operates as follows:

A. The quiescent situation

When the stationary transmitting-receiving stations of a district do not call a mobile radio transmitting-receiving station this means that in the control means 19 in each of the stationary stations (see FIG. 2) no call identification code enters through the channel 21. Then the switch 23 is in the position as shown in the drawing so that the output register 18 is connected to the input of the modulator (not shown) present in the transmitter $T_x$ which results in that the call channel frequency which is continuously transmitted by the transmitter $T_x$ is modulated with a code which is representative of the channel number indicated by said output register 18. This code may consist of a given combination of signals of tone frequency or binary signals. At the same time the control means 19 effects that one of the transceivers $TR_1, TR_2, \ldots TR_n$, which is tuned to the free duplex speech channel frequency indicated by the transmitted channel number is brought to the stand-by position for receipt.

In those mobile stations in which the telemicrophone 8 is on the hook contact 9 (see FIG. 3) and which consequently, although being turned on, are in their quiescent position, the control device 12 provides that the frequency synthesizer 7 is adjusted such by the call channel selector 10 such that the receiver 6 of the relevant mobile station is tuned to the call channel frequency which is locally received strongest. On receipt of this call channel frequency the channel number detector 27 which is connected to the output of the receiver 6 detects the channel number of a free duplex speech channel transmitted by the stationary station. This channel number is stored in the storage register 28. As long as a mobile station is not engaged by an incoming or outgoing call, it remains tuned to the call channel once the latter has been found, unless a moment arives that in conjunction with an increasing distance between the stationary station and the mobile station or as a result of co-channel interference the signal-to-noise ratio on the received call channel descends to below a given threshold value and consequently a squelch circuit which is normally present in the receiver of the mobile station becomes operative. A squelch circuit which is particularly suitable for this purpose, which also gives an early warning when co-channel-interference occurs has been described in detail in U.S. Pat. application No. 727,900, filed Sept. 29, 1976, now U.S. Pat. 4085370. At the moment the squelch circuit becomes operative it supplies through the lead 33 a warning signal to the control device 12 which subsequently automatically restarts the search procedure for the "strongest" call channel. Finally, the switchover to another call channel results in that the channel number stored in the storage register 28 is replaced by the channel number received on the new call channel. As soon as the duplex speech channel which corresponds with this channel number is occupied the relevant stationary transmitting-receiving station transmits through the call channel another channel number for substitution of the channel number stored in the storage register 28.

Accordingly the mobile stations of a district, owing to the channel number stored, know already in advance which duplex speech channel has to be selected for making or answering a call and thus a connection can be established and/or transferred more rapidly.

b. A call, set-up from a stationary transmitting receiving station

A call is first transmitted in the district in which the person is present who requires the connection with a mobile or fixed network subscriber. In the case there is no answer the call is repeated with priority. In the case that also this second call is not answered, a national call is possibly prepared through the national switching post.

The procedure is as follows:

Each one of the stationary transmitting-receiving stations of the district receives the identification code of the desired mobile station through the channel 21 (see FIG. 2). Receipt of the identification code results in that it is registered in the control means 19 and in that it is also supplied through the switch 23, (which is adjusted to the position not shown in the drawing) to the modulator of the transmitter $T_x$ to be modulated on the call channel frequency transmitted by this transmitter to all mobile stations within the district.

If the called mobile station (see FIG. 3) is located in the relevant district it will receive (as it listens at all times on the call channel of one of the stationary stations of the district) its individual identification code.

The received identification code is applied to control device 12 through the receiver 6 and signal detector 14. The control device 12 comprises in known manner means for recognizing the individual identification code and supplies in that case an output signal through lead 30 to the call indicator 13 which then gives a visible and/or audible indication that the relevant mobile station is called. If now in the mobile station thus called the telemicrophone 8 is lifted from its hook the hook contact 9 is operated and the call indicator 13 consequently applies a connection setup command through lead 31 to control device 12. The latter reacts by activating through lead 32 the speech channel selector 29 which subsequently selects the free duplex speech channel which is indicated by the channel number stored in the storage register 28. The control device 12 also effects that the individual identification code of the called mobile station is transmitted by the transmitter 5 through the selected free speech channel. As the stationary station which transmitted the relevant channel number listens on the speech channel corresponding with this channel number, the individual identification code transmitted by the mobile station will be received by this stationary station and transferred through the channel which connects to the relevant transmitter-receiver to the switching station which ensures in known manner that the connection with the caller is effected. In the stationary station the identification code received from the mobile station is also applied as an acknowledgement signal to the control means 19 which compares this identification code with the call identification code which was received at an earlier instant from the switching station. If the two identification codes are in agreement the control means 19 effects that in the manner already described above another channel number obtained from the output register 8 is transmitted through the call channel. As soon as one of the partners in the conversation hangs up his telemicrophone the stationary station transmits an interrupt code. The mobile station on receipt of the interrupt code starts searching again the call channel which is received strongest and tunes thereto.

c. A call set-up from a mobile station

A mobile subscriber making a call starts by taking the telemicrophone 8 (see FIG. 3) from the hook contact 9. This causes the call indicator 13 to supply through lead 31 a connection set-up command to the control device 12. Hereafter the latter activates the speech channel selector 29 through lead 32 for selecting the free duplex speech channel whose channel number is indicated by the storage register 28. After this speech channel selection the control device 12 also effects that the identification code of the relevant mobile station is transmitted through the selected speech channel.

On receipt of the identification code transmitted by the mobile station the stationary station changes the channel number on the call channel and transmits the identification code of the mobile station on the speech channel as acknowledgment. At the same time the mobile station is connected through the stationary station and the switching station to the wire-line telephone network. As a result, the mobile station will receive either the dialling tone or, possibly, the busy tone. Hereafter the mobile subscriber chooses, or has already chosen, the desired subscriber's number in advance and this number is thereafter transmitted through the speech channel. Termination of the call is done in the same manner as described sub b.

d. Switching over between neighbouring stationary transmitting-receiving stations of an existing connection between two parties In the mobile stations the quality of the connection is monitored by the squelch circuit which is part of the receiver of the mobile station. When the quality of the connection becomes poor the squelch circuit becomes operative and this fact is made known to the control device 12 through lead 33 (see FIG. 3). Hereafter the control device 12 starts the call channel selector 10 after approximately 2 seconds. The switching station through which the connection passes registers the disappearance of the connection as the speech channel frequency is no longer received and it is consequently informed of the switch-over activity of the relevant mobile station. As soon as the mobile station has found the call channel which is received strongest the channel number of a free duplex speech channel is received and stored in the storage register 28. As the telemicrophone 8 in the mobile station is not on the hook contact 9 the connection set-up command to the control device 12 follows automatically. Control device 12 thus activates the speech channel selector 29 through lead 32 for selecting the free duplex speech channel whose channel number is in the storage register 28. After tuning to this duplex speech channel the mobile station transmits its individual identification code (possibly provided with an additional information which indicates that a switchover of an existing connection is involved here). The switching station (the last one used or a neighbouring one) registers the receipt of this identification code and switches the connection through to the new stationary station. Then the call connection has been switched over and reinstated. The time required for this switch over during call can be specified as follows:

squelch circuit: 70 msec at a minimum
    searching for the strongest call channel: 70 msec.
    switching over to call channel: 2 msec.
    registration of the channel number: 30 msec.
    switch over to speech channel: 2 msec.
    transmitting individual identification code: 70 msec.
    in total: 244 msec. at a minimum.

Figure 4:
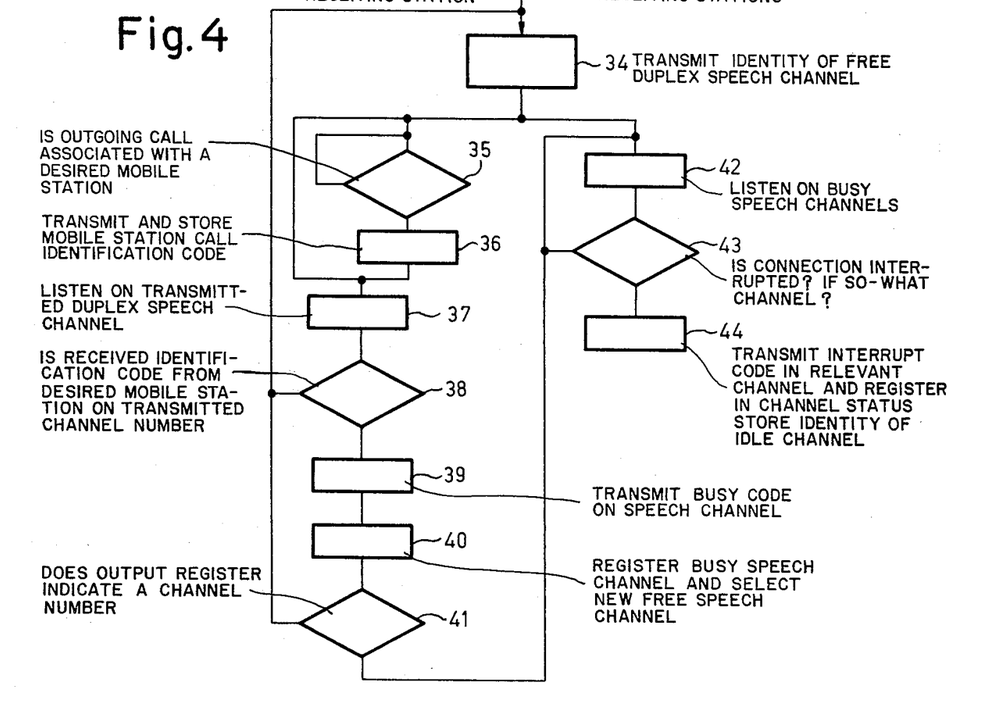
FIG. 4 shows a flow diagram for explaining the operation of the control unit present in the stationary station and constituted by a micro-computer.

FIG. 4 shows the flow diagram with the various decision criteria in accordance with which the control means 19 of the stationary transmitting-receiving station shown in FIG. 2, which control means 19 is constituted by a micro-computer, performs its various functions.

The first block 34 indicates the function which is each time repeated on receipt of a starting pulse. This function is: "transmit on the call channel the channel number of a free duplex speech channel indicated by the output register 18 of the channel status store 17 and give the command to perform the function indicated by block 37—listen on the speech channel which corresponds with the transmitted channel number—". Block 35 is representative of the question: is an outgoing call from the switching station coming in through the channel 21 in the form of a call identification code associated with a desired mobile station?". If the answer is "no" then the question is repeated. If the reply is "yes," then the command is given to perform the control function indicated by block 36: "transmit on the call channel the received call identification code associated with the desired mobile station and also store this call identification code in order to be able to verify report back." Block 38 is representative of the question: "is the identification code of the desired mobile station received through the speech channel corresponding with the transmitted channel number?". If the answer is "no" a new starting signal follows which causes the cycle described sofar to restart. If the reply is "yes" then the control function indicated by block 39 is performed: "transmit the busy code on the speech channel" (to prevent the channel from being occupied twice), followed by the control function indicated by block 40: "register in channel status store (17 in FIG. 2) that the duplex speech channel which corresponds with the transmitted channel number is busy and ensure that a new channel number of a free duplex speech channel is selected and stored in the output register 18." Then the question indicated by block 41 follows: "does the output register indicate a channel number?" If the answer is "no" (all duplex speech channels being occupied) then the function indicated by block 42 follows: "listen on the busy speech channels." Then follows the question indicated by block 43: "is a connection interrupted and, in the affirmative, which channel is it?." If the answer to this question is "no" then a command follows to perform again the function which is indicated by block 42. If, however, the answer to this question is "yes" then the control function indicated by block 44 follows: "transmit the interrupt code on the relevant channel and register in the channel status store 17 that the relevant channel is "idle."

Figure 5:
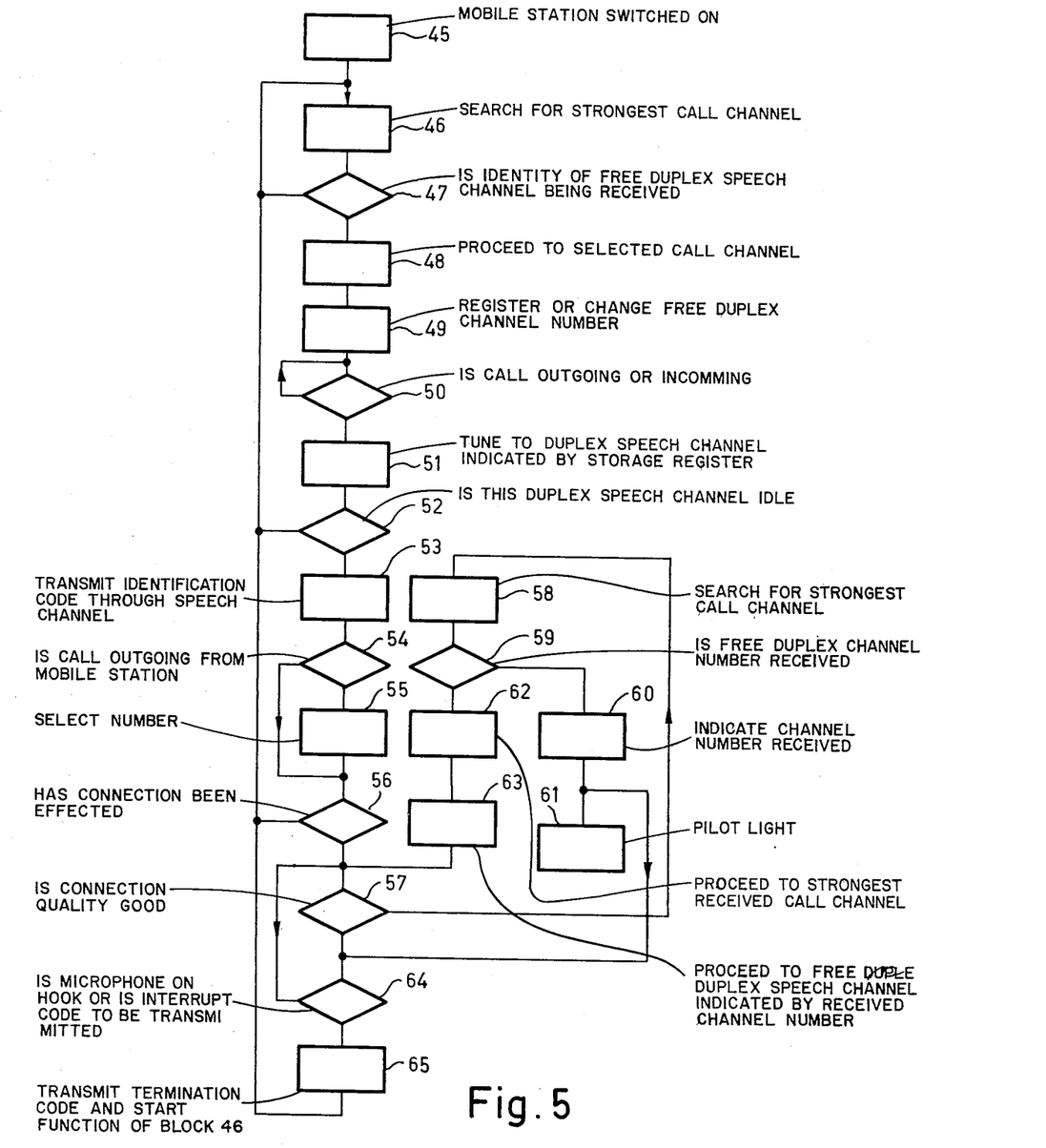
FIG. 5 shows a flow diagram for explaining the operation of the control device present in each of the mobile stations and constituted by a micro-computer.

FIG. 5 shows the flow diagram with the various decision criteria in accordance with the control device 12, constituted by a microcomputer, of the mobile transmitting-receiving station shown in FIG. 3 performs its various control functions.

In this flow diagram block 45 is representative of the function: "mobile station is switched on." If this is the case then the command follows to perform the control function indicated by the block 46: "start search procedure for selecting the call channel which is received strongest." When the call channel which is received strongest has been found the question indicated by block 47 follows: "is a channel number of a free duplex speech channel received through the selected call channel?." If the answer is "no" the search procedure indicated by block 46 for selecting the call channel which is received strongest is restarted. If the answer is "yes" then the command follows to perform the control function indicated by block 48: "proceed to the selected call channel." After tuning to this call channel the command follows to perform the control function indicated by the block 49: "register or change in the storage register (28 in FIG. 3) the channel number of the free duplex speech channel received through the call channel." The subsequent block 50 is representative of the question: "is a call outgoing or incoming?." If the answer is "no" the question is repeated. If the answer is "yes" then the connection set-up command follows and, consequently, performing the control function indicated by block 51 follows: "tune to the duplex speech channel which is indicated by the storage register (28 in FIG. 3)." Then follows the question indicated by block 52: "is this duplex speech channel idle?." If the answer is "no" then the search procedure indicated by block 46 for the call channel which is received strongest is started again. If the answer is "yes" then the command follows to perform the control function indicated by block 53: "transmit the individual identification code through the speech channel." Then the question indicated by block 54 follows: "is the call outgoing from the mobile station?." If this question is answered in the affirmative then the command follows to perform the control function indicated by the block 55: "select number; that is to say transmit identification code of the desired subscriber through the speech channel." Both after performing this control function of block 55 and also in the case the answer to the question of block 54 is "no" (call outgoing from fixed station) the question indicated by block 56 follows: "has the connection been effected?."

If the answer to this question is "no" the search procedure indicated by block 46 for selecting the call channel which is received strongest is restarted. If the answer to the question indicated by block 56 is "yes" then the question indicted by block 57 follows: "is the quality of the connection good?." If the answer to this question is "no" this means that the existing connection must be switched-over. To this end the function indicated by block 58: "start search procedure for selecting the call channel which is received strongest" is performed. Then follows the question indicated by block 59: "is a channel number of a free duplex speech channel received through the call channel?" if the answer is "no" this means that all available duplex speech channels are occupied which is ascertained by block 60. Thereafter block 60 gives the command to give an indication, for example, lighting up of a pilot lamp as indicated by block 61. If the answer to the question indicated by block 59 is "yes" then the command follows to perform the control function indicated by block 62: "proceed to the call channel which is received strongest." Then the command follows to perform the control function indicated by block 63: "proceed to the free duplex speech channel which is indicated by the received channel number." Hereafter the connection is automatically reinstated under the control of the switching station and the question indicated by block 57 follows: "is the quality of the connection good?." If the answer to this question is "no" then the cycle starts again from block 58. If the answer to the question of block 57 is "yes" and also if block 60 ascertains that all available speech channels are occupied (congestion) the question indicated by block 64 follows: "is own telemicrophone on—hook again or is the interrupt code to be transmitted by the stationary station received?." If the answer to this question is "no" then the question is repeated. If the answer is "yes" then the control function indicated by block 65 follows: "transmit termination code and start thereafter the control function indicated by block 46 for selecting the strongest call channel."

What is claimed is:

1. An automatic radio telephone system having:

a plurality of mobile transmitting-receiving stations, a plurality of stationary transmitting-receiving stations which can be coupled through a plurality of duplex speech channels to said mobile transmitting-receiving stations, a common switching station means coupled to said stationary stations for establishing any desired connection between said mobile stations or between said mobile stations and the subscribers of a line-wire telephone network, each one of said stationary transmitting-receiving stations comprising at least a transmitting means for continuously transmitting a signal on an individual call channel frequency which is specific for each stationary station, and furthermore each stationary station having means for using a plurality of duplex speech channels, each one of said mobile transmitting-receiving stations comprising a duplex speech channel selector and a call channel selector means for selecting the call channel frequency which is locally received strongest and which automatically tunes the mobile transmitting receiving station for reception on the selected call channel, wherein the improvement comprises a channel status store, a control means coupled to said store for up-dating in the channel status store of each stationary station the instantaneous occupancy status of duplex speech channels of that stationary station, a separate output register means coupled to each stationary station to the channel status store and controlled by said control means, said output register means providing the channel number of any free duplex speech channel, the transmitter means present in each stationary station continuously transmitting a signal on the call channel frequency which is specific for the stationary station, said call channel frequency signal being modulated by a code which is representative of the channel number provided by said output register, and each mobile station comprising a demodulator means and a storage register means for respectively demodulating and storing in said storage register the channel number transmitted over the received call channel, and a control device means coupled to said duplex speech channel selector for automatically tuning in response to a connection set-up command the transceiver of the mobile station to the duplex speech channel indicated by the channel number stored in said storage register.

2. A stationary transmitting-receiving station comprising:

at least one transmitter means for continuously transmitting a signal on an individual call channel frequency which is specific for the stationary station, and furthermore having means for using a plurality of duplex speech channels, wherein the improvement comprises a channel status store, a control means coupled to said using means for up-dating in the channel status store the instantaneous occupancy status of the duplex speech channels, and an output register means coupled to the channel status store and which is controlled by said control means, said output register means providing the channel number of any free duplex speech channel, and said transmitter means for continuously transmitting on the individual call channel frequency including a means for modulating the call channel frequency signal by a code which is representative of the channel number provided by said output register.

3. A mobile transmitting-receiving station comprising:

a duplex speech channel selector and a call channel selector means for selecting the call channel frequency which is locally received strongest and for automatically tuning the mobile transmitting-receiving station for reception on the selected call channel, wherein the improvement comprises a demodulator means and a storage register means for respectively demodulating and storing in the storage register means both prior and subsequent to the moment a microphone is lifted off hook a channel number transmitted continuously over the received call channel, means for transmitting a connection set up command signal the moment said microphone is lifted off hook, and a control device means coupled to said duplex speech channel selector and to said storage register means for automatically tuning in response to said connection set-up command signal the transceiver of the mobile station to the duplex speech channel indicated by the channel number stored in said storage register means.

* * * * *